(12) United States Patent
Weigerstorfer et al.

(10) Patent No.: US 10,173,346 B2
(45) Date of Patent: *Jan. 8, 2019

(54) DEVICE FOR PROCESSING PLASTIC MATERIAL

(71) Applicant: EREMA Engineering Recycling Maschinen und Anglagen Gesellschaft m.b.H., Ansfelden (AT)

(72) Inventors: Georg Weigerstorfer, Linz/Ebelsberg (AT); Klaus Feichtinger, Linz (AT); Manfred Hackl, Linz-Urfahr (AT); Gerhard Wendelin, Linz (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 242 days.

This patent is subject to a terminal disclaimer.

(21) Appl. No.: 14/965,538

(22) Filed: Dec. 10, 2015

(65) Prior Publication Data

US 2016/0096287 A1    Apr. 7, 2016

Related U.S. Application Data

(63) Continuation of application No. 13/641,087, filed as application No. PCT/AT2011/000180 on Apr. 13, 2011, now Pat. No. 9,216,521.

(30) Foreign Application Priority Data

Apr. 14, 2010   (AT) .................................. A 600/2010

(51) Int. Cl.
*B29B 13/00*   (2006.01)
*B29B 17/04*   (2006.01)
(Continued)

(52) U.S. Cl.
CPC ............ *B29B 17/0412* (2013.01); *B01F 7/16* (2013.01); *B01F 15/0251* (2013.01); *B29B 9/06* (2013.01);
(Continued)

(58) Field of Classification Search
CPC ............................. B65D 88/54; B65D 88/546
(Continued)

(56) References Cited

U.S. PATENT DOCUMENTS

| | | |
|---|---|---|
| 2,927,007 A | 3/1960 | Willy |
| 3,867,194 A | 2/1975 | Straube |

(Continued)

FOREIGN PATENT DOCUMENTS

| | | |
|---|---|---|
| AT | 400315 B | 12/1995 |
| CN | 101186103 A | 5/2008 |

(Continued)

OTHER PUBLICATIONS

International Search Report dated Jul. 29, 2011, for PCT Application No. PCT/AT2011/000180, 5 pages.

(Continued)

*Primary Examiner* — Galen H Hauth
(74) *Attorney, Agent, or Firm* — Kilpatrick Townsend and Stockton LLP

(57) ABSTRACT

Disclosed is a device and a method for processing plastic material with at least one receiving container, wherein at least one mixing and/or comminution tool, rotatable about a rotation axis, is arranged, for mixing and warming the plastic material, and with at least one conveyor for discharging the plastic material from the receiving container, with at least one screw rotating in a housing, where the conveyor is connected, at its material inlet side via an opening which is formed in a side wall of the receiving container, with the interior of the receiving container. An imaginary extension (Continued)

of the central longitudinal axis of the conveyor extends, against the conveyance direction of the conveyor, past the rotation axis of the receiving container, without intersecting this axis, where the longitudinal axis of the conveyor is offset by a separation relative to the radial ray of the receiving container on the discharge side.

13 Claims, 5 Drawing Sheets

(51) Int. Cl.
*B29B 13/10* (2006.01)
*B01F 7/16* (2006.01)
*B01F 15/02* (2006.01)
*B29B 9/06* (2006.01)
*B29K 105/26* (2006.01)

(52) U.S. Cl.
CPC ........ *B29B 13/10* (2013.01); *B29B 2017/048* (2013.01); *B29K 2105/26* (2013.01); *Y02W 30/625* (2015.05)

(58) Field of Classification Search
USPC ............................................ 241/86; 366/186
See application file for complete search history.

(56) References Cited

U.S. PATENT DOCUMENTS

| | | | |
|---|---|---|---|
| 4,579,288 A | 4/1986 | McDermid et al. | |
| 5,102,326 A | 4/1992 | Bacher et al. | |
| 5,282,548 A | 2/1994 | Ishihara | |
| 5,651,944 A | 7/1997 | Schulz et al. | |
| 5,783,225 A | 7/1998 | Bacher et al. | |
| 5,882,558 A | 3/1999 | Bacher et al. | |
| 5,988,865 A | 11/1999 | Bacher et al. | |
| 6,619,575 B1 | 9/2003 | Bacher et al. | |
| 6,719,454 B1 | 4/2004 | Bacher et al. | |
| 6,784,214 B1 | 8/2004 | Bacher et al. | |
| 6,883,953 B1 | 4/2005 | Bacher et al. | |
| 7,275,703 B2 | 10/2007 | Bacher et al. | |
| 7,275,857 B2 | 10/2007 | Bacher et al. | |
| 7,291,001 B2 | 11/2007 | Bacher et al. | |
| 7,309,224 B2 | 12/2007 | Bacher et al. | |
| 7,842,221 B2 | 11/2010 | Magni et al. | |
| 8,399,599 B2 | 3/2013 | Hackl et al. | |
| 8,419,997 B2 | 4/2013 | Hackl et al. | |
| 8,616,478 B2 | 12/2013 | Weigerstorfer et al. | |
| 8,835,594 B2 | 9/2014 | Hackl et al. | |
| 8,992,067 B2 | 3/2015 | Bacher et al. | |
| 9,266,272 B2 * | 2/2016 | Feichtinger | B01F 15/0289 |
| 2004/0201142 A1 | 10/2004 | Rumen | |
| 2004/0202744 A1 | 10/2004 | Bacher et al. | |
| 2004/0232578 A1 | 11/2004 | Magni et al. | |
| 2006/0093696 A1 | 5/2006 | Bacher et al. | |
| 2006/0292259 A1 | 12/2006 | Bacher et al. | |
| 2007/0007375 A1 | 1/2007 | Bacher et al. | |
| 2007/0102550 A1 | 5/2007 | Lin | |
| 2010/0101454 A1 | 4/2010 | Wendelin et al. | |
| 2010/0140381 A1 | 6/2010 | Weigerstorfer et al. | |
| 2011/0049763 A1 | 3/2011 | Hackl et al. | |
| 2011/0251368 A1 | 10/2011 | Hackl et al. | |
| 2012/0091609 A1 | 4/2012 | Feichtinger et al. | |
| 2012/0200000 A1 | 8/2012 | Klein et al. | |
| 2013/0092768 A1 | 4/2013 | Feichtinger et al. | |
| 2013/0113139 A1 | 5/2013 | Weigerstorfer et al. | |
| 2013/0168201 A1 | 7/2013 | Hackl et al. | |
| 2014/0234461 A1 | 8/2014 | Feichtinger et al. | |
| 2014/0234462 A1 | 8/2014 | Feichtinger et al. | |
| 2014/0239104 A1 | 8/2014 | Feichtinger et al. | |
| 2014/0248388 A1 | 9/2014 | Feichtinger et al. | |
| 2014/0252147 A1 | 9/2014 | Feichtinger et al. | |
| 2014/0252148 A1 | 9/2014 | Feichtinger et al. | |
| 2014/0271968 A1 | 9/2014 | Feichtinger et al. | |
| 2014/0287081 A1 | 9/2014 | Feichtinger et al. | |
| 2014/0291427 A1 | 10/2014 | Feichtinger et al. | |
| 2014/0295016 A1 | 10/2014 | Feichtinger et al. | |
| 2014/0299700 A1 | 10/2014 | Feichtinger et al. | |
| 2014/0312151 A1 | 10/2014 | Feichtinger et al. | |
| 2015/0239154 A1 | 8/2015 | Feichtinger et al. | |

FOREIGN PATENT DOCUMENTS

| | | |
|---|---|---|
| DE | 2839446 B1 | 1/1980 |
| DE | 3525554 A1 | 2/1986 |
| DE | 10140215 A1 | 2/2003 |
| DE | 202009015256 U1 | 4/2010 |
| EP | 0045734 A1 | 2/1982 |
| EP | 0103754 A1 | 3/1984 |
| EP | 0123771 A1 | 11/1984 |
| EP | 0321742 A1 | 6/1989 |
| EP | 0701505 A1 | 3/1996 |
| EP | 0735945 A1 | 10/1996 |
| EP | 0911131 A1 | 4/1999 |
| EP | 1181141 A1 | 2/2002 |
| EP | 1233855 A1 | 8/2002 |
| EP | 1 273 412 A1 | 1/2003 |
| EP | 0820375 A1 | 1/2003 |
| EP | 1401623 A1 | 3/2004 |
| EP | 1628812 A1 | 3/2006 |
| EP | 1628813 A1 | 3/2006 |
| EP | 2012997 A1 | 1/2009 |
| EP | 2196255 A1 | 6/2010 |
| ES | 2214171 T1 | 9/2004 |
| GB | 2030472 A1 | 4/1980 |
| JP | A-7-148736 | 6/1995 |
| JP | 2001-26019 A | 1/2001 |
| JP | 2001-30244 A | 2/2001 |
| SU | 536062 A1 | 11/1976 |
| UA | 1427 U | 10/2002 |
| WO | WO 97/18071 A1 | 5/1997 |
| WO | WO 01/81058 A1 | 11/2001 |
| WO | 02/36318 A1 | 5/2002 |
| WO | WO 03/004236 A1 | 1/2003 |
| WO | WO 03/103915 A1 | 12/2003 |
| WO | WO 2004/087391 A1 | 10/2004 |
| WO | 2004/108379 A1 | 12/2004 |
| WO | WO 2010/118447 A1 | 10/2010 |
| WO | WO 2011/051154 A1 | 5/2011 |

OTHER PUBLICATIONS

"Recyclinganlage Mit Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.
Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.
Bacher H., "Recycling Von Thermplastischen Primaerabfaellen: Recycling Primary Thermoplastic Waste, "Plasteverbarbeiter, Huethig GMBH, Heidelberg, DE, vol. 46, No. 2, Feb. 1, 1995, pp. 94, 97, & 98, XP000494391, ISSN: 0032-1338.
U.S. Appl. No. 14/351,677. Claims filed Mar. 24, 2015.
U.S. Appl. No. 14/351,869. Claims filed Mar. 11, 2015.

* cited by examiner

DEVICE FOR PROCESSING PLASTIC MATERIAL

This application is a continuation of U.S. patent application Ser. No. 13/641,087, filed Dec. 21, 2012, which is a U.S. National Phase under 35 U.S.C. § 371 of PCT Application No. PCT/AT2011/000180, filed Apr. 13, 2011, which claims priority to the Austrian Application No. 600/2010, filed Apr. 14, 2010, the entirety of each of which are hereby incorporated by reference herein.

The invention relates to a device according to the preamble of claim 1.

Numerous devices are known from the state of the art that comprise a receiving container or cutter compactor for the comminution, heating, softening and processing of a plastic to be recycled, and an extruder connected to such devices for melting the material prepared in this way is also known. The purpose here is to obtain a finished product of the highest possible quality level, usually in the form of a granulate.

Thus, in EP 123 177, for example, a device is described with a receiving container and an extruder connected to it, where the plastic material fed into the receiving container is comminuted by rotating the comminution and mixing tools, and brought into a vortex circulation, and at the same time heated by the added energy. As a result, a mixture forms with sufficiently good thermal homogeneity. After an appropriate residence time, this mixture is discharged from the receiving container via the screw extruder, and in the process plasticized or melted. The screw extruder is arranged here approximately at the height of the comminution tools and secured radially on the receiving container. In this way, the softened plastic particles are actively pushed into the extruder by the mixing tools.

Moreover, numerous devices are also known from the state of the art in which the extruder is connected tangentially to the receiving container.

All these devices share the fact that the conveyance and rotation direction of the mixing and comminution tools, and thus the direction in which the material particles circulate in the receiving container, and the conveyance direction of the extruder, are substantially the same or in the same direction. This arrangement, which is selected intentionally in this way, is based on the intention to tamp the material as much as possible into the screw, or to force feed the latter. In the process, and in variants based on this arrangement, care is always taken to ensure as high as possible a filling of the screw, and to produce a reinforcement of the tamping effect. For example, it has also been attempted to widen the draw-in area of the extruder to the shape of a cone or to curve the comminution tools to the shape of a sickle, so that they can feed the softened material like a spatula into the screw.

For this purpose, for example, in WO 88/02684, a device is described in which the extruder screw was moved out of the radial position, and connected with radial shift, but not tangentially, on the receiving container. This lateral offset has the result that the force component of the circumferential force exerted by the rotating tool, which component acts in the axial direction of the extruder screw, becomes greater in comparison to an arrangement in which the screw axis is arranged radially on the receiving container. As a result of the inlet-side offset, the tamping effect is further strengthened, and the plastic material is conveyed or pushed even better into the extruder by the rotating tool.

Such devices are definitely advantageous for some materials, particularly for drawn or very strong plastics as well as for hard, small-piece flakes.

However, it has been found in experiments that such devices surprisingly cannot be used as advantageously for all plastic materials to be recycled, and that, on the contrary, they can even present disadvantages in some areas.

Thus, for example, in the case of materials with a low energy content, such as, for example, PET fibers or films, or in the case of materials with an early sticky or softening point, such as, for example, polylactic acid (PLA), the effect that was observed again and again was that intentional tamping of the plastic material into the draw-in area of the extruder under pressure leads to premature melting of the material. This results, on the one hand, in a reduction of the conveyance effect of the extruder or of the grooved bush due to the lower toothing of the material with the grooves. In addition, partial backflow of this melt into the area of the cutter compactor or receiving container can occur, which leads to the still unmolten flakes adhering to the melt, and as a result the melt is cooled again and solidifies partially, and in this way a swelling-like structure or conglomerate made partially of solidified melt and solid plastic particles forms. The result is that the draw-in area of the extruder becomes clogged, and the mixing and comminution tools stick together. Subsequently, the throughput of the extruder decreases, because the filling of the snake is no longer sufficient. In addition, the mixing and comminution tools can get stuck in the process. As a rule, the installation has to be switched off in such cases, and cleaned completely.

In addition, problems occur with polymer materials that have already been heated nearly to their melting range in the cutter compactor. If the grooved bush is overfilled in the process, the material melts, and there is a reduction of drawing-in.

Problems also arise with the usually drawn, striped, fibrous materials that present a certain longitudinal extension and low thickness or stiffness, that is, for example, plastic films cut into strips. This is first and foremost the result of the oblong material becoming stuck on the discharge-side end of the draw-in opening of the screw, where one end of the strip extends into the receiving container, and the other end into a draw-in area. Since the mixing tools and also the screw run in the same direction, or apply the same conveyance direction component and pressure component on the material, both ends of the strips are exposed to traction and pressure in the same direction, and the strip can no longer be detached. This in turn leads to an accumulation of the material in this area, to a narrowing of the cross section of the draw-in opening, and to a worse drawing-in behavior and subsequently to throughput reductions. In addition, the elevated feed pressure in this area can lead to melting, which in turn results in the occurrence of the problems mentioned at the beginning.

Thus, the problem of the present invention is to provide a device by means of which the disadvantages mentioned at the beginning can be avoided, and by means of which even sensitive or stripe-shaped materials can be drawn in by the screw without problem.

This problem is solved in a device of the type mentioned at the beginning by the characterizing features of claim 1.

Here, it is provided that the imaginary extension of the central longitudinal axis of the conveyor or of the screw extends, against the conveyance direction of the conveyor, past the rotation axis of the receiving container, without intersecting this axis. The longitudinal axis of the conveyor is offset by a certain distance relative to the radial ray of the receiving container, which is in the same direction as or parallel to the longitudinal axis, on the discharge side, or in the rotation or movement direction of the mixing and/or comminution tool that moves past the opening, or of the plastic material that passes by the opening. As a result, the conveyance direction of the mixing tools and the conveyance direction of the extruder are no longer in the same direction, as known in the state of the art, but they are at least slightly in the opposite direction, which results in a reduction of the tamping effect mentioned at the beginning. Due to the intentional reversal of the rotation direction of the mixing and comminution tools, in comparison to the previously known devices, the feed pressure with respect to the draw-in position decreases, and the risk of overfilling is diminished. In this way, no excess material is tamped or spatula applied at excessive pressure into the draw-in area of the extruder; on the contrary, excessive material even tends to be removed from there, so that, although sufficient material is always present in the draw-in area, it is exposed to near zero pressure or only to a low pressure. In this way, the extruder screw can be filled sufficiently, and it can always draw in sufficient material, without local pressure peaks occurring, at which the material could melt.

In this way, melting of the material in the area of the extruder draw-in area is prevented, resulting in an elevation of the operating efficiency, an increase in the length of the maintenance interval, and a shortening of downtime due to possible repairs and cleaning measures.

Due to the reduction of the feed pressure, the pressure on any sliders that close the draw-in opening is also decreased, where the sliders can be used in a known way to regulate the filling degree of the screw. The sliders consequently react clearly more sensitively, and the filling degree of the screw can be adjusted even more precisely. In the case of heavier materials in particular, such as, for example, materials to be ground that are made of high-density polyethyelene (HDPE) or PET, the optimal operating point of the installation can thus be found more easily.

Moreover, it was found to be surprisingly advantageous that materials which were softened already to near melting are drawn in better during the operation in opposite directions according to the invention. In particular, if the material is already in a pasty or softened state, then the screw cuts itself the material out of the pasty ring. In the case of a rotation direction in the conveyance direction of the extruder screw, this ring would instead tend to be moved along, and no scraping off could occur, which would result in a reduction of the drawing-in. This is prevented by the reversal of the rotation direction according to the invention.

In addition, when processing the above-described striped or fibrous materials, stuck materials or accumulations that formed can be detached more easily, or they do not form at all in the first place, because, on the edge of the opening, which edge is located in the rotation direction of the mixing tools on the discharge side or downstream, the direction vector of the mixing tools and the direction vector of the extruder can point in almost opposite or at least slightly opposite directions, as a result of which an oblong strip cannot bend around and become stuck to this edge, rather it is pulled along again by the mixing vortex in the receiving container.

Overall, as a result of the arrangement according to the invention, the drawing-in behavior is improved, and the throughput is increased. The overall system of cutter compactor and extruder is more stable as a result.

Additional advantageous embodiments of the invention are described in the following dependent claims.

According to an advantageous variant of the invention, it is provided that the conveyor is arranged in such a way on the receiving container that the scalar product of the direction vector which is oriented so it is tangential with respect to the circle of rotation of the mixing and/or comminution tool, or with respect to the plastic material that passes by the opening, and normal with respect to the radial ray of the receiving container, and which points in the rotation or movement direction of the mixing and/or comminution tool, and the direction vector of the conveyance direction of the conveyor, is zero or negative at each individual point or in the entire area of the opening, or at each individual point or in the entire area immediately before the opening. In this way, the advantages mentioned at the beginning are achieved. Moreover, the crucial factor here is in particular not the spatial arrangement of the mixing tools and of the extruder with respect to each other; for example, it is not necessary for the mixing tools and the extruder screw respectively the opening to be necessarily in a common plane, and the rotation axis does not need to be oriented so it is normal with respect to the bottom surface or the longitudinal axis of the extruder.

An additional advantageous embodiment is obtained if the direction vector of the mixing and/or comminution tool forms an angle greater than or equal to 90°, and smaller than or equal to 180°, with the direction vector of the conveyance direction of the conveyor, where the angle at the intersection of the two direction vectors is measured at the upstream margin of the opening, with respect to the rotation or movement direction, particularly at the point that is located farthest upstream on this margin or the opening. As a result, the angular range described is the one in which the extruder must be arranged on the receiving container, in order to achieve the advantageous effects. Here, in the entire area of the opening or at each individual point of the opening, there is an orientation of the forces acting on the material that is at least slightly in opposite directions, or, in the extreme case, a pressure-neutral transverse orientation. At no point of the opening is the scalar product of the direction vectors of the mixing tools and of the conveyor screw positive; thus, an excessively large tamping effect does not occur even in a partial area of the opening.

In an additional advantageous embodiment of the invention, it is provided that the direction vector of the rotation or movement direction, and the direction vector of the conveyance direction enclose an angle of 170-180°, measured at the intersection of the two direction vectors in the middle of the opening. Such an arrangement is applicable, for example, if the extruder is arranged tangentially on the cutter compactor.

In order to ensure that no excessive tamping effect occurs, it is advantageous to provide that the separation is greater than or equal to half of the inner diameter of the housing of the conveyor or of the screw.

Moreover, in this sense, it can be advantageous to choose a size for the separation which is greater than or equal to 7%, or more advantageously greater than or equal to 20%, of the radius of the receiving container.

In the case of radially offset, but not tangentially arranged, extruders, it is advantageous to provide that the imaginary extension of the longitudinal axis of the conveyor, against the conveyance direction, penetrates the internal space of the receiving container at least in sections.

In this connection, it is advantageous if it is provided that the opening is arranged immediately before the rear—in the conveyance direction—end face of the screw.

In the case of extruders with an extended draw-in area or a grooved bush or an enlarged pocket, it can be advantageous if the separation is greater than or equal to the radius of the receiving container. This applies particularly to cases where the conveyor is connected tangentially to the receiving container.

The reversal of the rotation direction of the tools rotating in the container is in no way arbitrary, and one cannot—in the known devices or in the device according to the invention—allow the mixing tools to rotate in opposite direction without problem; this cannot be done particularly since the mixing and comminution tools are arranged somewhat asymmetrically or with directional orientation such that they can act on only one side or in only one direction. If one were to rotate such an apparatus in the wrong direction, then a good mixing vortex would not form, and there would not be sufficient comminution or warming of the material. Consequently, each cutter compactor has a fixed predetermined rotation direction.

In this connection it is particularly advantageous if it is provided that the front areas or front edges of the mixing and/or comminution tools, which act on the plastic material, and point in the rotation or movement direction, are designed, curved, placed or arranged differently, in comparison to the rear—in the rotation or movement direction—or lagging areas.

Here, an advantageous arrangement provides for arranging, on the mixing and/or comminution tool, tools and/or knives that act in the rotation or movement direction on the plastic material, with comminution effect and optionally also warming effect, where the knives are preferably arranged, in particular parallel to the bottom surface, on a carrier disk arranged so it can rotate.

In principle, the effects mentioned at the beginning are relevant not only with compressive screw extruders, but also with noncompressive conveyor screws. Here too, local excess feeding should be prevented.

In an additional advantageous embodiment, it is provided that the receiving container is substantially cylindrical, with a flat bottom surface and a cylinder barrel-shaped side wall that is vertical with respect to the bottom surface.

Moreover, in a simple construction, the rotation axis coincides with the central middle axis of the receiving container.

In an additional advantageous embodiment, it is provided that the rotation axis or the central middle axis is oriented so it is vertical or normal with respect to the bottom surface.

As a result of these special geometries, the drawing-in behavior is optimized in a device of stable construction and simple structure.

In this connection, it is also advantageous to provide that the lowermost mixing and/or comminution tool and/or the opening are arranged at a small separation from the bottom surface, particularly in the area of the lowermost quarter of the height of the receiving container.

Moreover, it is advantageous for the processing if the outer edges of the mixing and/or comminution tool extend close to the side wall.

According to the invention, a method for operating such a device is also provided.

Here, on the one hand, the rotation and/or movement direction of the mixing and/or comminution tool must be set in such a way, and the mixing and/or comminution tool must be designed or the knives arranged in such a way, and the mixing and/or comminution tool must be arranged and oriented in such a way in the receiving container that a proper mixing and processing of the polymer material occurs. Here, a correct mixing vortex must form, and the mixing and/or comminution tool must be able to act correctly on the material, that is, with mixing, warming, and optionally comminuting effect.

Moreover, one must ensure that the rotation or movement direction of the mixing and/or comminution tool is set in such a way that the imaginary extension of the central longitudinal axis of the conveyor or of the screw is moved, against the conveyance direction of the conveyor, past the rotation axis of the receiving container without intersecting it, where the longitudinal axis of the conveyor is offset by a separation relative to the radial ray of the receiving container, which is in the same direction or parallel with respect to the longitudinal axis, on the discharge side or in the rotation or movement direction of the mixing and/or comminution tool which moves past the opening or of the plastic material which is moved past the opening. As a result, the above-mentioned advantageous effects are achieved.

This method can be developed further using the characteristics of the dependent claims regarding the device.

Additional advantages and embodiments of the invention can be obtained from the description and the associated drawings.

The invention is represented diagrammatically with the help of embodiment examples in the drawings, and it is described below, based on an example, in reference to the drawings.

Figure 1:
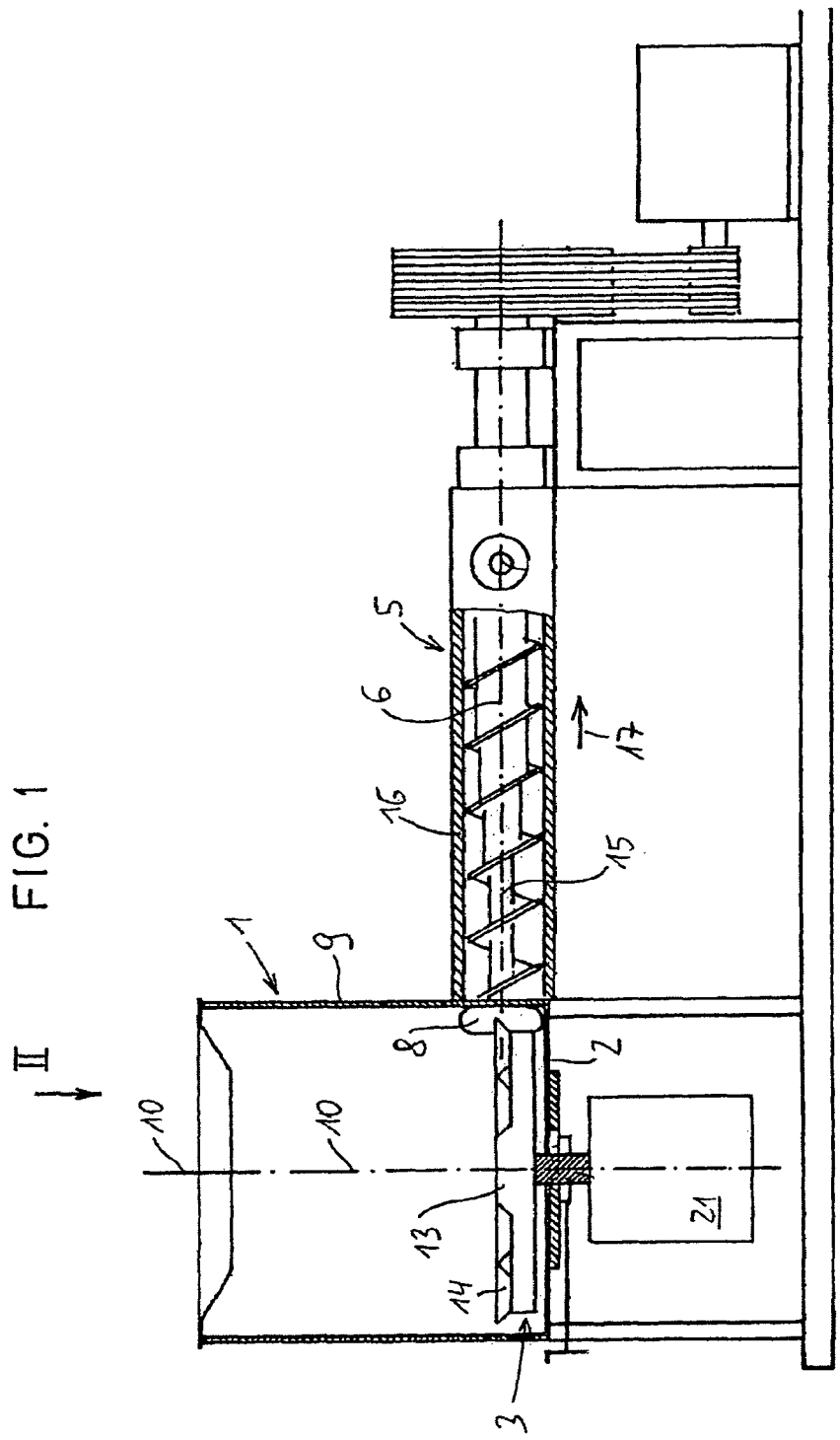
FIG. 1 shows a vertical section through a device according to the invention.

The advantageous device for processing or recycling plastic material, represented in FIG. 1, shows a receiving container or cutter compactor 1, which is known sufficiently from the state of the art, for example, from EP 123 771. The receiving container 1 is cylindrical with a flat bottom surface 2 and a cylinder barrel-shaped side wall 9 which is oriented vertically with respect to the bottom surface.

At a small separation from the bottom surface 2, at approximately 10-20%, optionally less, of the height of the side wall 9—measured from the bottom surface 2 to the uppermost margin of the side wall 9—a flat carrier disk 13 is arranged, which is oriented parallel to the bottom surface 2, and which can be rotated about a central rotation axis 10, which is at the same time the central middle axis of the receiving container 1, in the rotation or movement direction 12 marked by an arrow. The carrier disk 13 is driven by a motor 21 which is located beneath the receiving container 1. On the carrier disk 13, knives 14 are arranged, which, together with the carrier disk 13, form the mixing and/or comminution tool 3.

Figure 2:
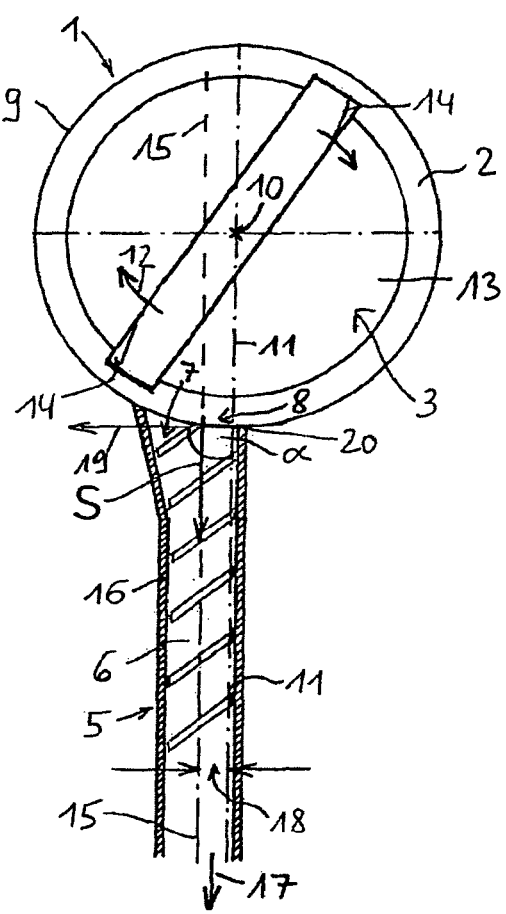
FIG. 2 shows a horizontal section through a slightly modified embodiment in the direction of the arrow II of FIG. 1.

As shown diagrammatically in FIG. 2, the knives 14 are not arranged regularly on the carrier disk 13, rather they are designed, placed or arranged in a special way, on the front edge pointing in the rotation or movement direction 12, in order to be able to act on the plastic material. As a result, a mixing vortex forms in the receiving container 1, where the material is moved about turbulently, from top to bottom and also in the rotation direction 12. Such a device can consequently be operated only in the predetermined rotation or movement direction 12, because of the special arrangement of the mixing and comminution tools 3 or of the knives 14, and the rotation direction 12 cannot be reversed without problem or without modifications.

Moreover, to improve the supplying of material to the opening 8, deflectors can be mounted on the periphery of the container or on the side wall 9.

Figure 3:
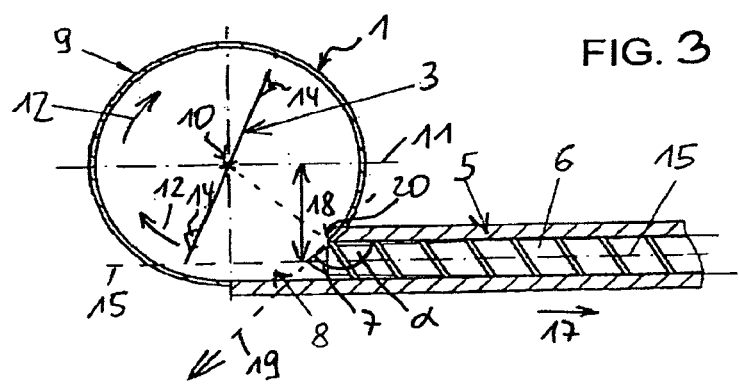
FIG. 3 shows an additional embodiment with a larger radial offset.
Figure 4:
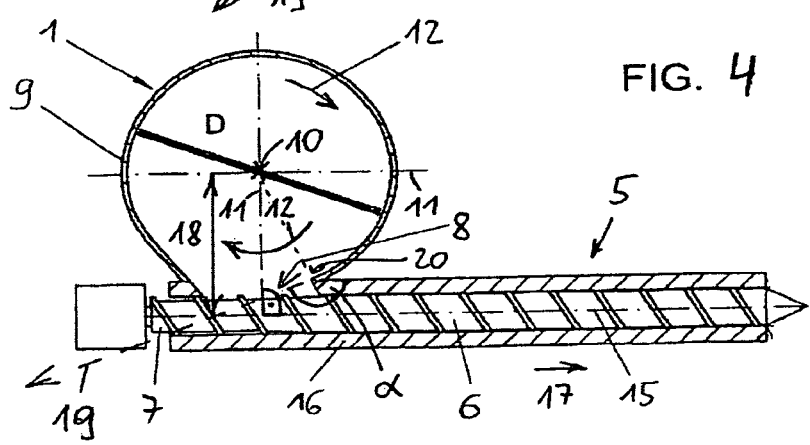
FIG. 4 shows an additional embodiment with an approximately tangentially connected extruder.

The mixing and comminution tools 3 represented in FIGS. 3 and 4 are also represented only diagrammatically. The knives 14 are arranged on the front edges 22 acting on the material (FIG. 3).

Theoretically, it is also possible for the mixing and comminution tools 3 to present a regular or symmetric structure. However, in that case as well, the rotation or movement direction 12 cannot be reversed at will; rather they are predetermined by the motor or by special geometries of the receiving container 1 and/or of the draw-in area of the extruder 5.

Figure 6:
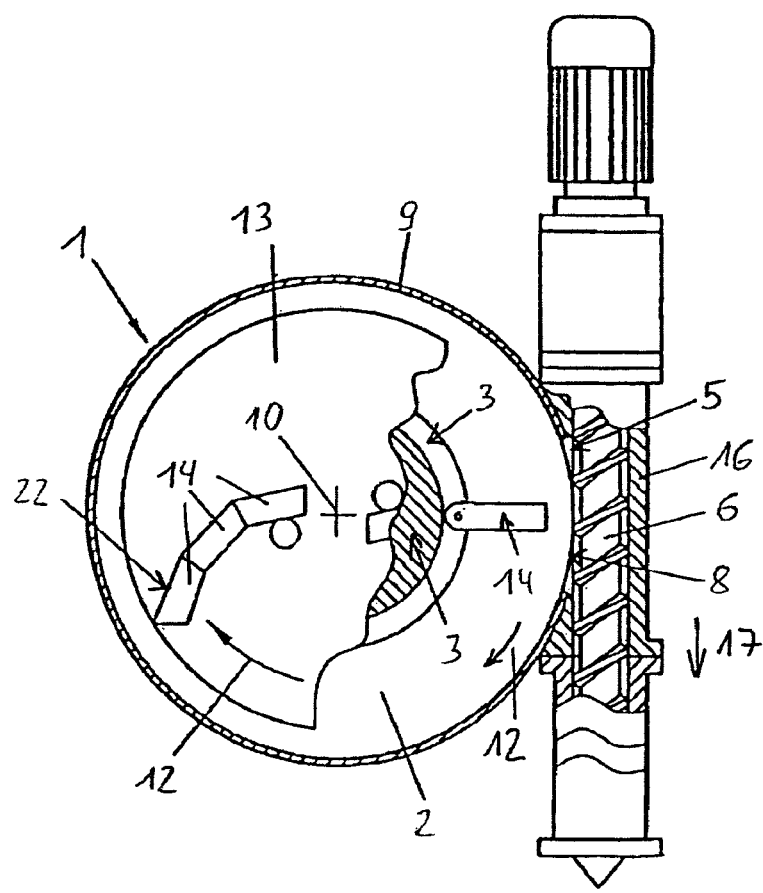
FIG. 6 shows a device known from the state of the art.

For comparison, a device known from the state of the art is shown in FIG. 6. It has two levels of mixing and comminution tools 3 which rotate in the direction of the arrow 12, that is not in the direction according to the invention. In the vicinity of the bottom 2, rotating knives 14 which have a radial or straight orientation are arranged in the lower level. In the overlying level, on a carrier disk 13, knives 14 with front cutting edges 22 are arranged, which are curved or angled against the rotation direction 12. During operation, this results in the wanted and necessary mixing vortex, during the rotation of the tools. A simple change of the rotation direction 12 is thus not possible precisely here.

At the height of the, in the present case single, comminution and mixing tool 3, in the side wall 9 of the receiving container 1, an opening or inlet or feed opening 8 is formed, to which the housing 16 of a conveyor 5 is connected. A compressive extruder screw 6 is mounted in the housing 16 so it can rotate, and it can be driven by a shaft of the motor 21.

The outer edges of the mixing and comminution tools 3 extend relatively close, approximately 5% of the radius, to the side wall 9. The screw 6 and the housing 16 of the extruder 5, in the area of the opening 8, are adapted to the contour of the inner wall of the receiving container 1, and set back. No part of the extruder 5 extends into the internal space of the receiving container 1. The mixing and/or comminution tools 3 or the knives 14 are located at approximately the same height or level as the central longitudinal axis 15 of the extruder 5. However, the outermost ends of the knives 14 are at a sufficient separation from the end face 7 of the extruder 5.

In the examples represented in the figures, the extruder is always a compressive single shaft or single screw extruder. However, alternatively, it is also possible to provide double or multiple shaft extruders, or to install noncompressive conveyor screws.

During operation, the plastic material to be processed, usually in the form of plastic waste, bottles or films, is introduced via an open feeding funnel into the receiving container 1. Alternatively, it can be provided that the receiving container 1 is closed, and can be evacuated at least to a technical vacuum. The plastic material introduced is comminuted by the rotating mixing and comminution tools 3, mixed, and in the process warmed and softened, but not melted, by the added mechanical frictional energy. After a certain residence time in the receiving container 1, the softened, but not molten material, is introduced into the draw-in area of the extruder 5 or into the opening 8, and there it is gripped by the screw 6, and subsequently melted.

In FIG. 2, a cross section through an embodiment that is very similar to FIG. 1 is represented, at the level of the extruder screw 6. One can see that the rotation axis 10 as well as the central middle axis of the receiving container 1 coincide, and that the cross section of the receiving container 1 is circular. Alternatively, elliptical shapes or an eccentric arrangement of the rotation axis 10 would also be possible.

The extruder 5 is a conventional extruder which in itself is known, in which, in a first zone, the softened plastic material is melted, subsequently compression occurs, and then the melt exits on the opposite side. The extruder 5 conveys in the direction of the arrow 17. The housing 16 as well as the screw 6 are slightly widened conically on the discharge side in the draw-in area. The opening 8 is arranged immediately before the rear end face 7 of the screw 6.

In the embodiment according to FIG. 2, the extruder or conveyor 5 is not connected radially to the receiving container 1, but offset on the discharge side. The backward imaginary extension of the central longitudinal axis 15 of the conveyor 5 or of the screw 6, against the conveyance direction 17 of the conveyor 5, extends on the left alongside past the rotation axis 10, without intersecting this axis. The longitudinal axis 15 is here offset by a separation 18 in the rotation or movement direction 12, relative to the radial ray 11 of the receiving container 1, which is in the same direction as or parallel to the longitudinal axis. The backward imaginary extension of the longitudinal axis 15 of the conveyor 5 penetrates the internal space of the receiving container 1.

The separation 18 in FIG. 2 corresponds to approximately 15-20% of the radius of the receiving container 1. In the present case, the separation 18 corresponds approximately to half the inner diameter of the housing 16, and thus represents a first limit case or extreme value with smallest possible offset or separation 18, in which the rotation or movement direction 12 of the mixing and/or comminution tools 3 is oriented at least slightly in the opposite direction of the conveyance direction 17 of the conveyor 5, in fact over the entire surface of the opening 8. The terms "directed opposite" or "in the opposite direction" here denotes any orientation of the vectors with respect to each other which does not result in an acute angle, as explained in detail below.

In other words, the scalar product of a direction vector 19 of the rotation direction 12, which is oriented so it is tangential to the circle of rotation of the mixing and/or comminution tool 3 or tangential with respect to the plastic material that passes by the opening 8, and which points in the rotation or movement direction 12 of the mixing and/or comminution tools 3, and a direction vector 17 of the conveyance direction of the conveyor 5, which extends in the conveyance direction parallel to the central longitudinal axis 15, at each individual point of the opening 8 or in the area immediately before the opening 8 is everywhere zero or negative, but nowhere positive.

In FIG. 2, the scalar product is exactly zero at the farthest upstream limit-value point 20 which is located on the farthest upstream margin of the opening 8. The angle α between the direction vector 17 of the conveyance direction and the direction vector 19, measured at point 20 of FIG. 2, is exactly 90°. If one moves along the opening 8 towards the left, that is further in the rotation direction 12, then the angle α becomes increasingly larger, forming an obtuse angle, and at the same time the scalar product becomes negative. However, at no point or area of the opening 8 is the scalar product positive, or the angle α smaller than 90°. As a result, local excess feeding cannot occur even in a partial area of the opening 8, or a damaging excess tamping effect cannot occur in any area of the opening 8. Thus, there is also no decisive difference compared to a radial arrangement, because point 20 or the edge 20, in the case of a radial arrangement of the extruder 5, would present an angle α<90°, and those areas of the opening 8 that are located to the right alongside the radial ray 11, or upstream or on the inlet side, would have a positive scalar product. As a result, locally molten plastic material can accumulate in these areas.

In FIG. 3, an alternative embodiment is represented, in which the conveyor 5, on the discharge side, is offset even further radially than in FIG. 2, and the separation 18 is correspondingly larger. The angle α measured at point 20 is approximately 145°, which results in the tamping effect being further reduced compared to the device of FIG. 2, which can be even more advantageous for certain sensitive polymers. The margin of the housing 16, on the right side viewed from the receiving container 1, is installed tangentially on the receiving container 1, where, in contrast to FIG. 2, no dull transition edge is formed on which the material could be caught.

In FIG. 4, an additional alternative embodiment is represented, in which the extruder 5 is connected tangentially on the receiver container 1. The angle α, measured at point 20 between the direction vector 19 and the direction vector 17 is, approximately 160°, which is near maximal. In the present case, the backward imaginary extension of the longitudinal axis 15 of the conveyor 5, no longer penetrates the internal space of the receiving container 1, rather it extends alongside past it. The separation 18 is enlarged further and it is even greater than the radius of the receiving container 1. The extruder 5 is thus offset towards the exterior in a pocket-like broadening, or the draw-in area is slightly deeper. An angle β between the direction vector 19 and the direction vector 17, which is not included in the drawing of FIG. 4, and which is measured in the middle or in the center of the opening 8, is approximately 175°. The device according to FIG. 4 represents the second limit case or extreme value with the relatively smallest tamping effect. In such an arrangement, a particularly pressure-less feeding is possible, and such a device is advantageous particularly for sensitive materials that are processed close to the melting area, or for material in the form of long strips.

Figure 5:
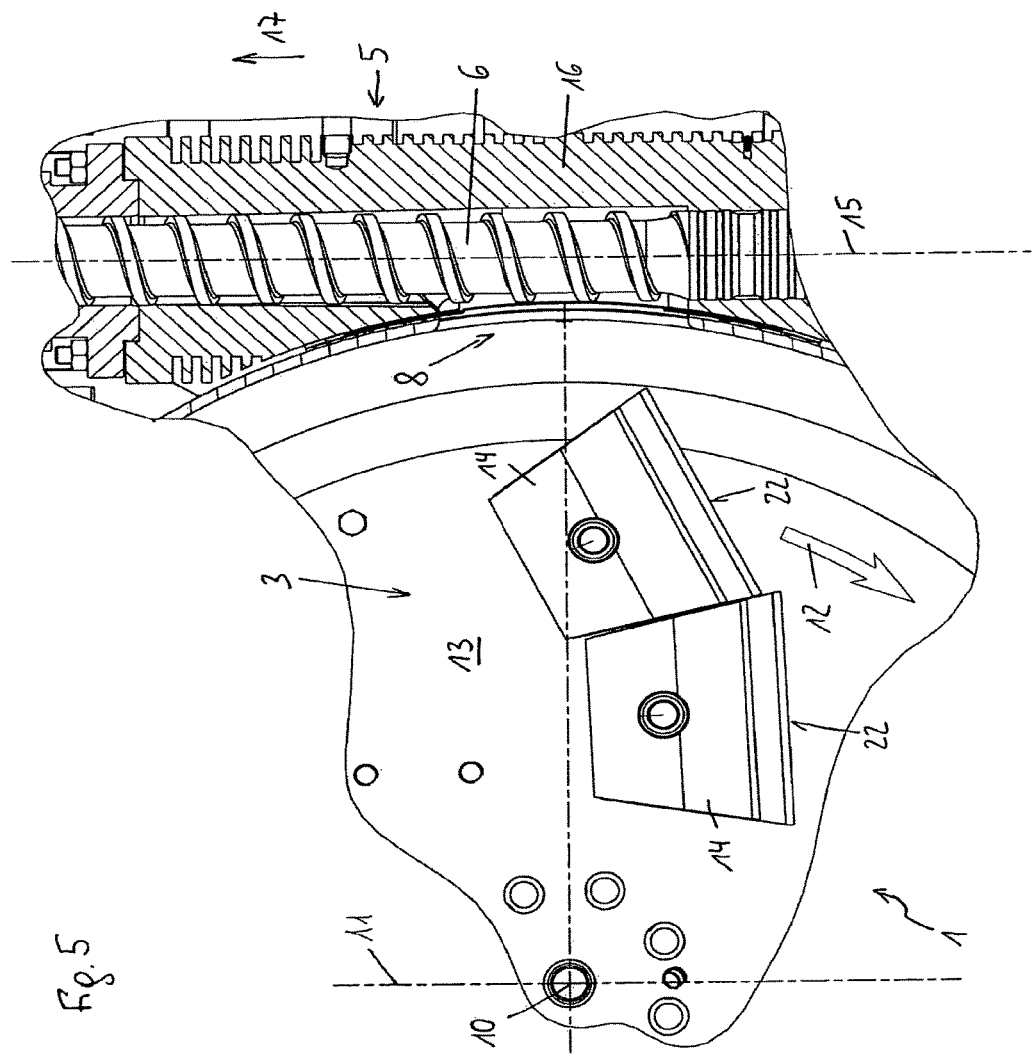
FIG. 5 shows an additional embodiment with an approximately tangentially connected extruder and curved mixing tools.

FIG. 5 shows an additional alternative embodiment with tangentially connected extruder 5, and with knives or tools 14 on the carrier disk 13 that are curved and mutually offset, where the front cutting edges 22, viewed in the rotation direction 12, effect a comminution and warming of the material.

What is claimed is:

1. A device for treating plastic materials, comprising:
    at least one receiving container (1) in which at least one mixing and/or comminution tool (3) which is rotatable around a rotational axis (10) is disposed for mixing said plastic materials, and
    at least one conveyor (5) for transporting the plastic materials out of the receiving container (1), said conveyor (5) having at least one screw (6) rotating in a housing (16) and, said conveyor (5) being connected at its material input side to the interior of the receiving container (1) via an opening (8) formed in a lateral wall (9) of said receiving container (1), wherein the central longitudinal axis (15) of the conveyor (5) and of the screw (6) extends in a direction opposite the conveying direction (17) of the conveyor (5) and past the rotational axis (10) of the receiving container (1) without intersecting it, said central longitudinal axis (15) of the conveyor (5) and the screw (6) being offset in the rotational and moving direction (12) of the mixing and/or comminution tool (3) at a discharge side by a distance (18) from a radial line (11) of the container (1), which is parallel to the longitudinal axis (15) and, in the conveying direction (17) of the conveyor (5), extends outwards from the rotational axis (10) of said mixing and/or comminution (3) tool,
    wherein the conveyor (5) is connected to the receiving container (1) such that a scalar product of a direction vector (19) of the mixing and/or comminution tool (3) which is oriented tangential with respect to the circle of rotation of the mixing and/or comminution tool (3) and normal with respect to a radial ray (11) of the receiving container (1), and which points in the rotation or movement direction (12) of the mixing and/or comminution tool (3), and a direction vector (17) of the conveyance direction of the conveyor (5), is zero or negative at each point of the opening (8).

2. A device according to claim 1, characterized in that the direction vector (19) of the mixing and/or comminution tool (3) and the direction vector (17) of the conveyance direction of the conveyor (5) form an angle (α) greater than or equal to 90°, and smaller than or equal to 180°, measured at the intersection of the two direction vectors (17, 19), at a portion of the opening (8), which is upstream with respect to the rotation or movement direction (12).

3. A device according to claim 1, characterized in that the direction vector (19) of the mixing and/or comminution tool (3) and of the rotation or movement direction (12), and the direction vector (17) of the conveyance direction enclose an angle (β) of 170-180°, measured at the intersection of the two direction vectors (17, 19) in the middle of the opening (8).

4. A device according to claim 1, characterized in that a separation (18) is greater than or equal to half the inner diameter of the housing (16) of the conveyor (5) or of the screw (6), and/or ≥7%, preferably ≥20%, of the radius of the receiving container (1).

5. A device according to claim 1, characterized in that the portion of the longitudinal axis (15) of the conveyor (5) and the screw (6) in the direction opposite the conveying direction (17) of the conveyor (5), penetrates the internal space of the receiving container (1) at least in sections.

6. A device according to claim 1, characterized in that the opening (8) is arranged immediately before a rear end face (7), in the conveyance direction (17), of the screw (6).

7. A device according to claim 1, characterized in that a separation (18) is greater than or equal to the radius of the receiving container (1).

8. A device according to claim 1, characterized in that the conveyor (5) is connected tangentially on the receiving container (1).

9. A device according to claim 1, characterized in that the mixing and/or comminution tool (3) comprises tools and/or knives (14) that act, in the rotation or movement direction (12), on the plastic material, with comminution effect and optionally also warming effect, where the tools or knives (14) are arranged preferably on a rotatable carrier disk (13) that is arranged parallel to a bottom surface (12).

10. A device according to claim 1, characterized in that the conveyor (5) is a noncompressive screw conveyor or a compressive screw conveyor.

11. A device according to claim 1, characterized in that the receiving container (1) is substantially cylindrical, with a flat bottom surface (2) and a cylinder barrel-shaped side wall (9) that is vertical with respect to the bottom surface, and/or the rotation axis (12) coincides with the central middle axis of the receiving container (1), and/or the rotation axis (12) or the central middle axis present an orientation that is vertical or normal with respect to the bottom surface (2).

12. A device according to claim 1, characterized in that the lowermost mixing and/or comminution tool (3) and/or the opening (8) are arranged at a small separation from the bottom surface (2), wherein arranging the lowermost mixing and/or comminution tool (3) and/or the opening (8) at a small separation from the bottom surface (2) places the lowermost mixing and/or comminution tool (3) in the area of a lowermost quarter of the height of the receiving container (1).

13. A device according to, claim 1, characterized in that the outer edges of the mixing and/or comminution tools (3) extend close to the side wall (9).

* * * * *